United States Patent
Maier et al.

(10) Patent No.: US 8,528,975 B2
(45) Date of Patent: Sep. 10, 2013

(54) DRIVE DEVICE FOR A MOTOR VEHICLE SWIVEL SEAT

(75) Inventors: Jürgen Maier, Weitersweiler (DE); Reimer Völz, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 348 days.

(21) Appl. No.: 12/437,064

(22) Filed: May 7, 2009

(65) Prior Publication Data

US 2009/0284061 A1 Nov. 19, 2009

(30) Foreign Application Priority Data

May 7, 2008 (DE) .......................... 10 2008 022 419

(51) Int. Cl.
*A47C 1/00* (2006.01)

(52) U.S. Cl.
USPC ................................ 297/344.21; 297/344.23

(58) Field of Classification Search
USPC ............................ 297/344.21, 344.22, 344.23
See application file for complete search history.

(56) References Cited

U.S. PATENT DOCUMENTS

| | | | |
|---|---|---|---|
| 2,242,247 A | 5/1941 | Grant | |
| 2,992,852 A | 7/1961 | Loofbourrow et al. | |
| 3,051,522 A | 8/1962 | Myers | |
| 3,572,817 A * | 3/1971 | Colautti et al. | 297/344.22 |
| 4,802,706 A | 2/1989 | Onimaru et al. | |
| 5,474,353 A | 12/1995 | Koester et al. | |
| 6,520,579 B2 * | 2/2003 | Kassai et al. | 297/344.22 X |
| 7,204,554 B2 * | 4/2007 | Wieclawski | 297/344.21 |

FOREIGN PATENT DOCUMENTS

| | | |
|---|---|---|
| DE | 10120769 A1 | 10/2002 |
| DE | 102004013799 A1 | 10/2005 |
| GB | 525663 A | 9/1940 |
| GB | 2434089 A | 7/2007 |
| WO | 8400525 A1 | 2/1984 |

OTHER PUBLICATIONS

UK Patent Office, British Office Action dated Dec. 16, 2011 for GB Application No. 0907596.1.
UK Patent Office, British Search Report dated Nov. 8, 2009 for GB Application No. 0907596.1.

* cited by examiner

*Primary Examiner* — Anthony D Barfield
(74) *Attorney, Agent, or Firm* — Ingrassia Fisher & Lorenz, P.C.

(57) ABSTRACT

A motor vehicle, a vehicle seat for a motor vehicle, and a drive device are provided for swiveling-in and swiveling-out a vehicle seat that is swivelable about a substantially vertical axis, in particular for a front motor vehicle seat which is connected to a motor vehicle by means of a rotary frame. The drive device includes, but is not limited to a first drive unit that applies a driving force for causing a swiveling movement of the seat in at least one swiveling direction. A second drive unit is provided which acts against the first drive unit to provide a second driving force which acts simultaneously against the driving force of the first drive unit, which second driving force causes a second swiveling movement of the vehicle seat.

14 Claims, 2 Drawing Sheets

DRIVE DEVICE FOR A MOTOR VEHICLE SWIVEL SEAT

CROSS-REFERENCE TO RELATED APPLICATION

This application claims priority to German Patent Application No. 102008022419.7, filed May 7, 2008, which is incorporated herein by reference in its entirety.

TECHNICAL FIELD

The invention relates to a drive device for swiveling-in and swiveling-out a vehicle seat, to a vehicle seat for a motor vehicle, and to a motor vehicle.

BACKGROUND

Known from prior art are swivelable vehicle seats for motor vehicles to make it easier for the user of the vehicle to get in and out of the vehicle. From DE 101 20 769 A1 and DE 10 2004 013799, for example, one swivel seat arrangement, respectively, for a vehicle is known. The swivel seat arrangement has a base frame and a seat frame for receiving a seat, which seat frame is swivelably supported in a swivel bearing of the base frame and is swivelable about a substantially vertical axis, and a locking means for interlocking of seat frame and base frame. The driving for the swiveling movement of the seat takes place by means of complex and costly actuators such as gas springs, electric motors, hydraulic drives, and the like.

It is at least one object of the present invention to provide a motor vehicle, a swivel seat, and a swiveling drive, which are structured lighter and less complex. In particular, it is an object to realize an easy-entry and easy-exit which can be actuated in a simple manner and which is light and minimally complex. Furthermore, other objects, desirable features, and characteristics will become apparent from the subsequent summary and detailed description, and the appended claims, taken in conjunction with the accompanying drawings and this background.

SUMMARY

The invention includes the technical teachings that, in a drive device for swiveling-in and swiveling-out a vehicle seat that is swivelable about a substantially vertical axis, in particular for a front motor vehicle seat which is connected to a motor vehicle by means of a rotary frame, the drive device comprising at least one drive unit that applies a driving force causing a swiveling movement of the seat in at least one swiveling direction, it is provided that a second drive unit is provided which acts against the first drive unit to provide a second driving force which acts simultaneously against the driving force of the first drive unit, which second driving force causes a second swiveling movement of the seat.

The seat is swivelable relative to the motor vehicle, for example, by means of the rotatably mounted seat frame. For supporting the swiveling, a drive unit is provided, and the drive unit carries out the swiveling completely or supports a manually initiated swiveling. The drive unit causes a swiveling by means of a provided driving force which acts in a first swiveling direction. In addition, the drive device has a second drive unit acting against the first drive unit. "against" principally means acting in a different direction than the first drive unit. Preferably, the second drive unit acts opposing, that is, in exactly the opposite direction, to the first drive unit. The first drive unit and the second drive unit act simultaneously, that is, no switching takes place, for example, in an end position. The drive units are designed non-switching, which results in a lower complexity. The two drive units can be integrated in one unit, wherein, however, the driving forces act simultaneously. Each drive unit carries out a driving force. The driving force can be unequally high, respectively, depending on a respective swivel position of the seat. In this manner, there is a neutral position in which the two driving forces cancel each other out. In this position, a manual swiveling is required to cause a swiveling of the seat. This neutral swivel position is located between a first end position and a second end position. The first end position can be a position in which the seat is oriented for driving, that is, oriented in a longitudinal motor vehicle direction. The second end position can be a position that is swiveled by an angle, in which position the user can get in or out of the vehicle, for example, swiveled by about 30° to about 90° with respect to the longitudinal motor vehicle direction. Preferably, the neutral swivel position is located approximately in the middle between the two end positions. In this manner, a kind of oscillating drive is realized which, in case of a manual shifting, can perform an oscillating movement about the neutral swivel position.

In a preferred embodiment of the invention, it is therefore provided that the two drive units are coupled in such a manner that their effects are canceling each other out in a neutral position between two end positions, a moved-in position and a moved-out position. The coupling takes place, for example, in that the two drive units are engaged with the same side of the seat, are preferably configured within adjacent areas, and are counteracting, for example, acting in a swivel-in direction, that is, towards the moved-in position, and in a swivel-out position, that is, towards the moved-out position. Alternatively, or in combination, the drive units can be engaged with different sides. The moved-in position corresponds to the orientation in driving direction or the longitudinal direction of the motor vehicle, respectively, so that in the moved-in position, the seat orientation forms an angle with the longitudinal axis of the motor vehicle of approximately 0°, viewed from above. In the moved-out position, the seat orientation forms an angle with the longitudinal axis of the motor vehicle in the range of approximately 30° to approximately 90°.

In a further embodiment, it is provided that the first drive unit causes a swiveling in a region from a first end position to the neutral position. Since the drive units are configured counteracting, the swiveling must be initiated manually. Here, the swiveling takes place against a (first) drive and towards the (second) drive. The drives are configured in such a manner that the driving force increases with increasing displacement from the neutral swivel position against the direction of action of the driving force, or decreases in direction of action, respectively. In this manner, during swiveling from the neutral position, one drive acts stronger than the other one. Upon canceling out a manual transmission of force, the drive which is stronger because of the swiveling causes a swiveling back into the neutral position against the weaker drive. Due to the drive configured in the manner of an oscillating drive, the swiveling does not stop directly in the neutral position, but rather the seat is swiveled beyond the neutral position so that the force ratio is reversed, and a swiveling back is caused again.

A further embodiment thus provides that the second drive causes a swiveling in a region from a second end position to the neutral position. An oscillating movement or an overshooting, respectively, can be stopped or reduced either manually or by means of locking means, dampers, or the like.

In a further embodiment of the present invention, it is provided that at least one of the drive units, preferably both drive units, are configured as a spring storage unit. In this manner, a driving force of the respective drive unit can be caused in a simple manner by tensioning or releasing the tension, that is, by swiveling out of the neutral position. By means of an appropriately wide displacement, the driving force is increased or decreased, respectively, depending on the swivel position. A drive unit can be configured, for example, as a compression spring. The other drive unit can be configured as a tension spring attached on the same side of the engagement point of the compression spring, or, again as a tension spring, can be attached on an opposite side. If the seat is now displaced from a neutral position to an end position, then one spring is pre-tensioned whereas the other spring is released.

Therefore, one embodiment of the present invention provides that the spring storage unit charges energy during swiveling from the neutral position into the other end position, and releases energy during swiveling from the neutral position into the other end position.

To realize a comfortable getting in and out of the vehicle, in one embodiment is provided that the drive device comprises at least one locking or latching device for locking and/or unlocking the motor vehicle seat in an end position. In this manner, it is prevented that the seat disengages unintentionally from the end position. In the moved-in position, that is, in a driving position, the seat is locked in such a manner that the user can safely drive the vehicle without the seat swiveling unintentionally into another position. During exiting the vehicle, the seat is locked in the moved-out position so that the user must not be afraid when getting in/getting out of the vehicle that the seat suddenly moves.

A further embodiment of the present invention provides that the latching device can be coupled with the motor vehicle so that the latching device locks and/or unlocks depending on a state of the motor vehicle. If the motor vehicle is driving, for example, an unlocking is not possible for safety reasons. In this case, the coupling can be coupled with the on-board electronics, or the like. For example, it can also be detected if an ignition key is in the ignition lock; as soon as an ignition key is in the ignition lock, a locking in a moved-in, first end position can take place. When no ignition key is present, for example, a locking in the second end position can be carried out. The locking in the second end position can also be carried out, for example, when the door is open.

The locking can be unlocked automatically, semi-automatically, or manually, for example by means of a button, as long as no safety concerns exist, for example, the lock can not be unlocked during the driving of the motor vehicle.

By means of the oscillating drive, a simply structured drive of a swivel seat can be realized. The swiveling is manually initiated by a displacement out of the neutral position. The manual swiveling is supported up to the end position by the oscillating drive. In the end position, the seat can be locked. Upon unlocking of the locking, a support of the swiveling of the seat into the other end position takes place. In doing so, the seat is swiveled beyond the neutral position, whereby the acting driving forces are reversed.

The spring storage units are preferably configured as springs, selected from a group comprising compression springs, spiral springs, tension springs, leaf springs, and torsion springs, and the like. In this manner, a progressively increasing pre-tension/decreasing tension release can be realized with increasing displacement.

Moreover, the invention includes the technical teaching that for a vehicle seat, in particular a front motor vehicle seat which is substantially swivelable about a vertical axis and which comprises a seat connected to a motor vehicle by means of a rotary frame, it is provided that the seat has a drive device for supporting the swiveling-in and swiveling-out of the motor vehicle seat into at least two end positions to make it easier for a user to get in and out of the vehicle. In this manner, a seat can be realized which is less complex and can be build in a light construction.

Not least, the invention includes the technical teaching that for a motor vehicle having at least one seat, it is provided that the seat is configured according to a vehicle seat according to an embodiment of the invention. The motor vehicle can be any vehicle comprising station wagons, vans, mini vans, limousines, coupes, sports cars, off-roaders, convertibles, buses, transporters, and the like. The seat or the drive device, respectively, can be retrofitted or can be configured to be integrated directly into the motor vehicle.

To implement the version of the mechanical swivel seat in a comfortable manner, in the end positions swiveled-in (approximately 0°) and swiveled-out (approximately 30°-90°), preferably, a spring drive is provided. Thus, the start movement and/or the end movement of the swivel seat are operated spring-supported. Here, an inexpensive, effective, spring-supported swiveling movement is created, which minimizes the required forces at manual actuation of the swiveling movement. In addition, the user comfort is significantly increased compared to a manual swiveling movement which is not operated with this invention.

The manually driven swivel seat is provided with springs in the end positions. These springs, which, on the one hand, are located on the rotary frame and, on the other hand, on stationary vehicle floor assemblies, are pre-tensioned by means of the manual rotational movement during swiveling of the swivel seat. The swivel seat engages in the respective end position with the spring pre-tensioned in this manner. Upon actuating a lever for releasing from the swivel position, the pre-tensioned spring initiates the swiveling procedure. In the middle, neutral position, the seat thus swivels approximately by half of its potential swiveling movement by means of spring support. The further movement is performed manually to initiate at the same time a spring tensioning procedure for the swivel-in movement. Upon the manually actuated unlocking of the swivel seat from the swivel-out position, again, the spring-supported swivel-in movement up to approximately half of the swiveling path into the vehicle takes place. Here also, the further movement is carried out manually to generate at the same time the spring pre-tension for the swivel-out movement. Thus, a quasi-servo-supported manual swivel seat is created. As springs, different types can be used here, from the tension or compression spring to the leaf spring, from the spiral spring to the torsion spring. In addition, different types of attachment are possible. The lever for releasing—or release lever for short—is arranged such that a closing door actuates the same when the swivel seat is locked in its end position, and hence the locking, which keeps the seat in the end position, is released so that the swivel seat is rotated by means of the kinetic energy of the door towards the vehicle interior without allowing any damage.

By the use of the above described invention, a self-supporting, mechanical swiveling movement from the respective end positions of a swivel seat is created. For this function, no expensive, complex mechanics or electrics is necessary.

Further measures which improve the invention are identified in the sub-claims or arise from the following description of exemplary embodiments of the invention, which are schematically illustrated in the figures. For identical or similar components or features, uniform reference numbers are used here. Features or components of different embodiments can be combined to obtain further embodiments. All features and/or advantages, including constructional details, spatial arrangements, and process steps, which arise from the claims, the description, or the drawings, can be essential for the invention, individually as well as in different combinations.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
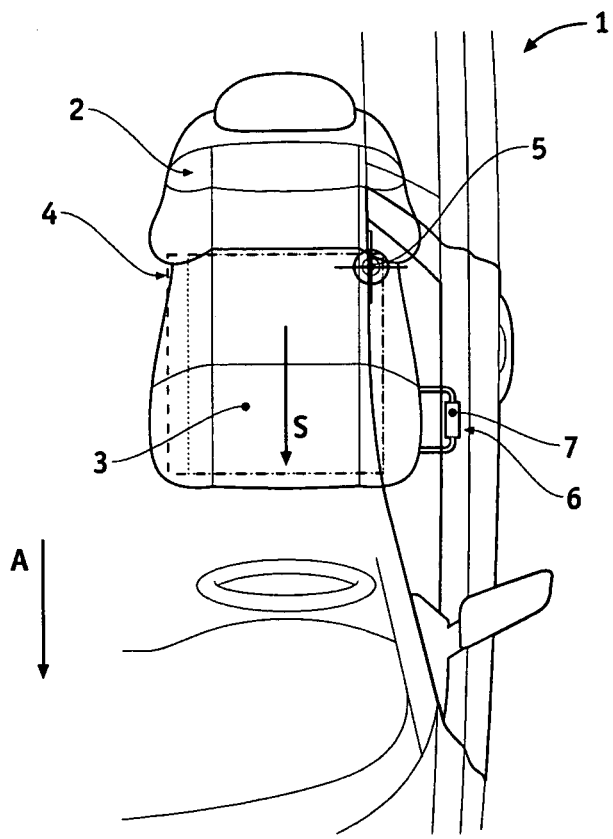
FIG. 1 shows schematically from above, a cut-out of a motor vehicle having a vehicle seat which can be swiveled by means of a drive unit according to an embodiment of the invention and which is in a swiveled-in position.

FIG. 1 shows schematically a cut-out of a motor vehicle 1. The motor vehicle 1, of which the area of a driver's cab is shown here, has a vehicle seat 2. The vehicle seat 2 is configured as a swivelable vehicle seat, or swivel seat 2 for short. The swivel seat 2 comprises a rotary frame which, in the shown view, is located below a seat device 3 configured as a seat upholstery of the swivel seat 2, and therefore is not visible here. By means of the rotary frame arranged on a motor vehicle floor area 4, the swivel seat 2 is swivelable about a vertical axis 5, that is, substantially in a horizontal plane. For this, the swivel seat 2 has two drive units, which are described in FIG. 2 in more detail. In FIG. 1, the swivel seat 2 is in a moved-in position or in a first end position. In this position, the swivel seat 2 is oriented in (longitudinal) direction of the motor vehicle, that is, the seat orientation S forms approximately an angle of 0° with an (imaginary) longitudinal axis A of the motor vehicle. In other words, the seat orientation S runs substantially parallel to the longitudinal motor vehicle axis A (viewed from above). In this position—the first end position—the vehicle seat 2 is latched or locked by means of a latching device 6 so that the swivel seat 2 can not move unintentionally out of this position. To release the latched position, and to swivel the swivel seat 2 into a moved-out position, the latching device 6 has an actuating lever 7 by means of which the locking can be released, and the swivel seat 2 is released for swiveling. When the swivel seat 2 is in the shown end position and is latched, the actuating lever 7 can also be actuated by means of a closing vehicle door 8, 8'. A closing vehicle door 8' is indicated by a broken line. In the shown position of the vehicle door, the vehicle door contacts the suitably arranged actuating lever 7. During the contacting and the actuation of the lever 7, the latching of the swivel seat 2 is released. By means of the kinetic energy of the vehicle door during the closing movement, and by means of the stored energy of the drive units, the swivel seat 2 is moved into the vehicle interior. In this manner, operating errors, injury, and/or damages can be prevented.

Figure 2:
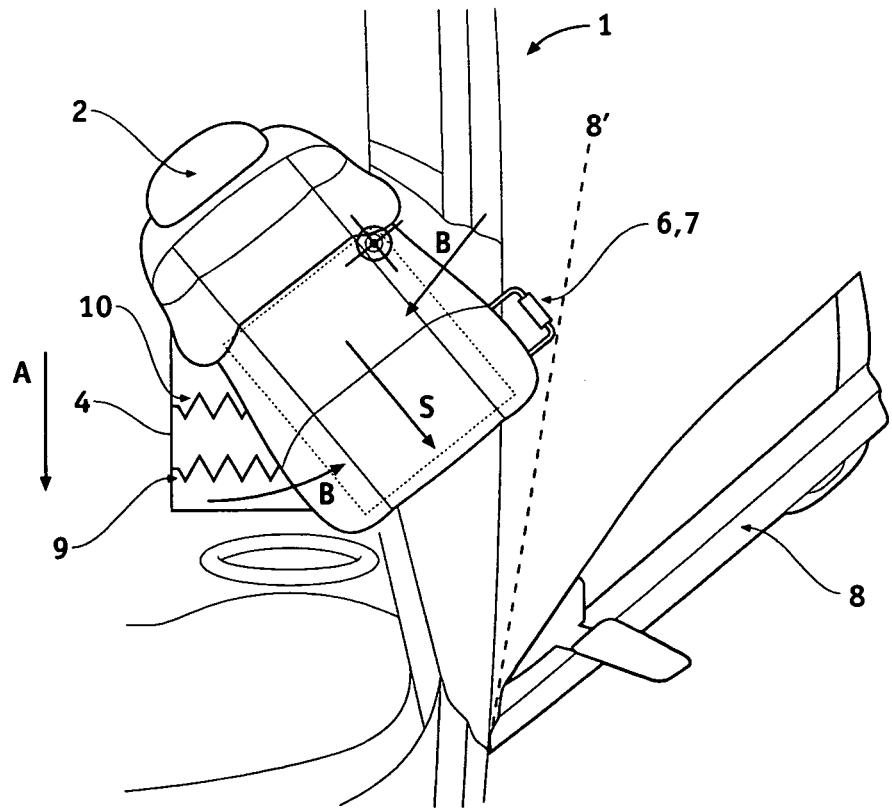
FIG. 2 shows the cut-out according to FIG. 1 with the swiveled-out vehicle seat.

FIG. 2 shows schematically the cut-out as FIG. 1, and the swivel seat 2 is shown in a moved-out position. In this swiveled-out or moved-out position, the swivel seat 2 is in a second end position. In this position, the seat orientation S forms an angle with the longitudinal axis A of the motor vehicle, which angle is greater than approximately 0° and is preferably within a range of greater than or equal to approximately 15° and less than or equal to approximately 120°, more preferred greater than or equal to approximately 30° and less than or equal to approximately 100°, and most preferred greater than or equal to approximately 40° and less than or equal to approximately 90°. In this position, the swivel seat 2 projects partially beyond the closed car contour so that for reaching this position, a motor vehicle door 8 must be opened. In this moved-out position, two drive units 9 and 10, which support a swiveling of the swivel seats 2, are shown. A first drive unit 9 is presently configured as a tension spring. A second drive unit 10 is presently configured as a compression spring. The drive units 10 simultaneously apply driving forces to the vehicle seat 2 which act opposite to each other. Depending on the design of the drive units 9, 10, this results in a neutral position for the swivel seat in which the driving forces of the drive units 9, 10 cancel each other out, and the swivel seat remains without latching device 6. In this position, both springs are partially pre-tensioned. If the swivel seat 2 is moved out of the neutral position in one direction, then one of the springs is further elongated and hence further tensioned, whereas the other spring is shortened and hence tension-relieved. In this position, the drive units 9, 10 aim for the neutral position so that in the respective end position, the swivel seat 2 must be locked by means of the latching device 6 so that the swivel seat 2 stays in this position. The opposing swiveling movements, which the swivel seat carries out during a displacement, are schematically shown by means of the arrows B. The drive units 9, 10, which are configured here as springs, are arranged here on one side of the swivel seat 2. Accordingly, the drive units 9, 10 must be configured in a manner that they act opposite to each other. Alternatively, or in combination, the drive units 9, 10 can be configured equally acting, for example both acting as tension springs; however, for this, the drive units 9, 10 must be arranged on different sides so that the driving forces can act opposite to each other.

Figure 3:
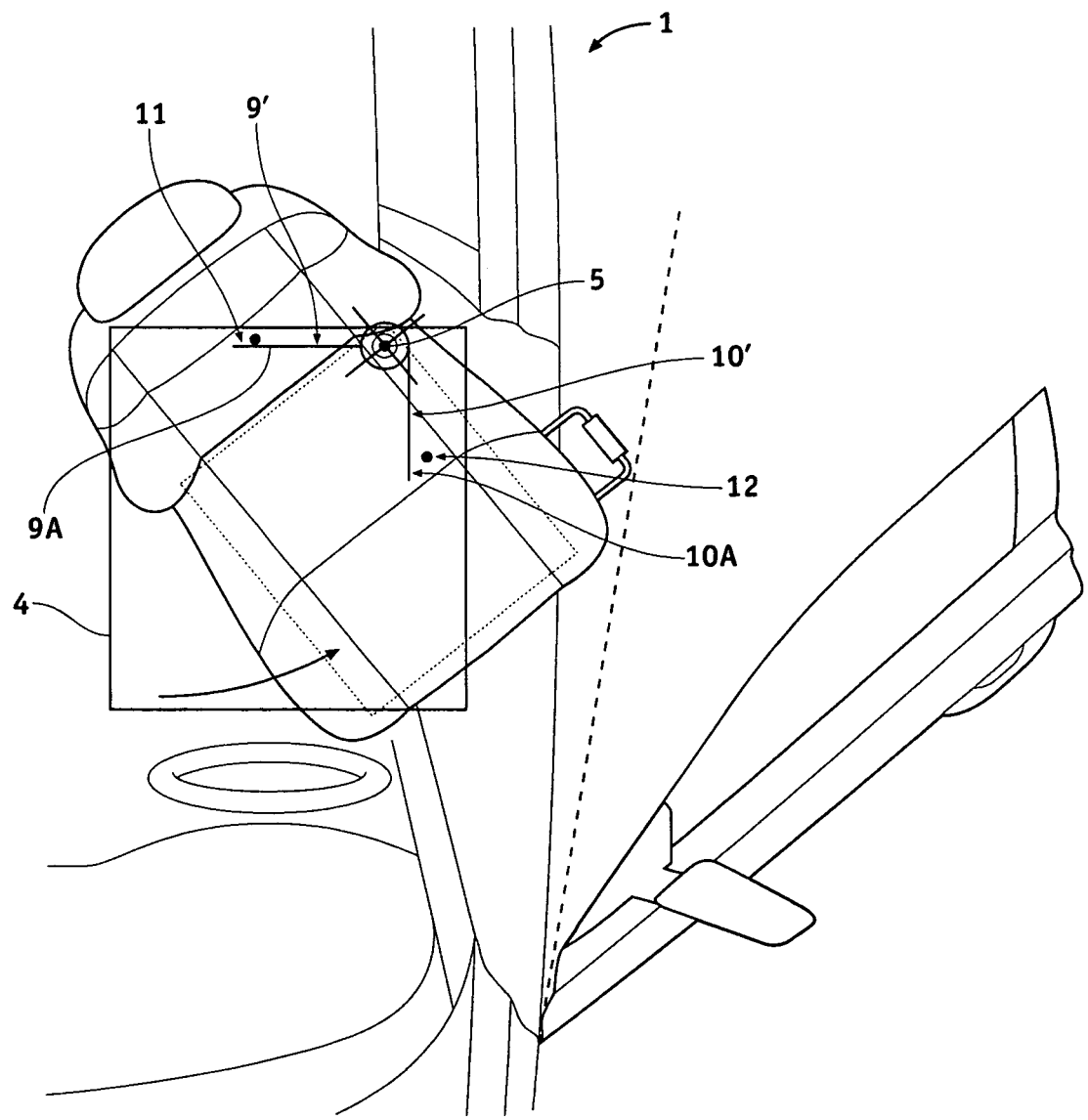
FIG. 3 shows schematically from above, a cut-out of a motor vehicle having a different embodiment of the drive units in a swiveled-out position.

FIG. 3 shows schematically from above, a cut-out of the motor vehicle 1 having a different embodiment of the drive units 9', 10' in a swiveled-out position. In FIG. 3, the motor vehicle floor area 4 and the vertical axis 5 as well as the two drive units 9', 10' are shown highlighted since the embodiment according to FIG. 3 substantially differs within this area from the embodiment according to FIG. 1 and FIG. 2. The drive units 9', 10' are integrated here in one unit which is configured as a leg spring. Each leg 9a, 10a of the leg spring abuts against a stop 11, 12. Corresponding to the preceding principle, the leg spring is pre-tensioned on one leg 9a, 10a during swiveling, and is tension-relieved on the other leg 10a, 9a. In this manner, the drives are configured non-switching.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A drive device for swiveling-in and swiveling-out a vehicle seat that is swivelable about a substantially vertical axis, the drive device comprising:
   a first drive unit adapted to apply a first driving force for causing a swiveling movement of the vehicle seat in a swiveling direction; and
   a second drive unit adapted to act against the first drive unit and provide a second driving force which acts substantially simultaneously against the first driving force such that the second driving force causes a second swiveling movement of the vehicle seat, wherein the first drive unit and the second drive unit are coupled in such a manner to substantially cancel each other out in a neutral position between a first end position and a second end position.

2. The drive device according to claim 1, wherein the first drive unit is adapted to causes a swiveling from the first end position to the neutral position.

3. The drive device according to claim 1, wherein the second drive unit causes a swiveling from the second end position to the neutral position.

4. The drive device according to claim 1, wherein at least one of the first drive unit and the second drive unit is configured as a spring-storage-unit.

5. The drive device according to claim 4, wherein the spring-storage-unit releases energy during the swiveling from a first end position into a neutral position, and releases energy during the swiveling from the neutral position into a second end position.

6. The drive device according to claim 1, wherein the first drive unit comprises a latching device for locking the vehicle seat.

7. The drive device according to claim 6, wherein the latching device is coupled with a motor vehicle so that the latching device locks depending on a state of the motor vehicle.

8. A vehicle seat of a motor vehicle that is swivelable about a substantially vertical axis, comprising:
   a rotary frame;
   a seat device connected to the motor vehicle with the rotary frame;
   a first drive unit adapted to apply a first driving force for causing a swiveling movement of the vehicle seat in a swiveling direction; and
   a second drive unit adapted to act against the first drive unit and provide a second driving force which acts substantially simultaneously against the first driving force such that the second driving force causes a second swiveling movement of the vehicle seat, wherein the first drive unit and the second drive unit are coupled in such a manner to substantially cancel each other out in a neutral position between a first end position and a second end position.

9. The vehicle seat according to claim 8, wherein the first drive unit is adapted to causes a swiveling from the first end position to the neutral position.

10. The vehicle seat according to claim 8, wherein the second drive unit causes a swiveling from the second end position to the neutral position.

11. The vehicle seat according to claim 8, wherein at least one of the first drive unit and the second drive unit is configured as a spring-storage-unit.

12. The vehicle seat according to claim 11, wherein the spring-storage-unit releases energy during the swiveling from a first end position into a neutral position, and releases energy during the swiveling from the neutral position into a second end position.

13. The vehicle seat according to claim 8, wherein the first drive unit comprises a latching device for locking the vehicle seat.

14. The vehicle seat according to claim 13, wherein the latching device is coupled with the motor vehicle so that the latching device locks depending on a state of the motor vehicle.

* * * * *